(12) United States Patent
Lanciault (10) Patent No.: US 6,798,416 B2
(45) Date of Patent: Sep. 28, 2004

(54) GENERATING ANIMATION DATA USING MULTIPLE INTERPOLATION PROCEDURES

(75) Inventor: Robert Lanciault, Sante-Julie (CA)

(73) Assignee: Kaydara, Inc., Montreal (CA)

( * ) Notice: Subject to any disclaimer, the term of this patent is extended or adjusted under 35 U.S.C. 154(b) by 244 days.

(21) Appl. No.: 10/197,224

(22) Filed: Jul. 17, 2002

(65) Prior Publication Data

US 2004/0012592 A1 Jan. 22, 2004

(51) Int. Cl.$^7$ ............................................. G06T 15/70
(52) U.S. Cl. ....................... 345/474; 345/473; 345/475
(58) Field of Search ................................ 345/473, 475, 345/474

(56) References Cited

U.S. PATENT DOCUMENTS 5,818,461 A 10/1998 Rouet et al.

OTHER PUBLICATIONS

Search Report under Section 17 for Application No. GB 0216817.7; Jul. 7, 2003; Great Britain Patent Office.

Primary Examiner—Mark Zimmerman
Assistant Examiner—Peter-Anthony Pappas
(74) Attorney, Agent, or Firm—Harness, Dickey & Pierce, PLC (57) ABSTRACT

Animation data is produced in a data processing system that has storage, a processor, a visual display (102) and a manual input device (103). A simulated three-dimensional world-space is displayed to a user and an animatable actor is displayed in the world-space. First input data is received from a user specifying a desired location and orientation of the actor to which the actor is to animate towards from a starting location. The processor is instructed to generate first animation data using a first processing technique possibly using a forward kinematic solver. The processor is instructed to generate second animation data using a second processing technique, in response to the same input data, possibly using an inverse kinematic solver. Second input data defines a blend parameter for blending between the first animation data and the second animation data. Output animation data is produced by interpolating between the first animation data and the second animation data to extents controlled by the blending parameter.

18 Claims, 8 Drawing Sheets

GENERATING ANIMATION DATA USING MULTIPLE INTERPOLATION PROCEDURES

BACKGROUND OF THE INVENTION

1. Field of the Invention

The present invention relates to generating animation data for a character, in which a character is modelled as a set of elements connected by joints constrained in terms of their permitted movement types.

2. Description of the Related Art

Many techniques for the generation of animation data in a data processing system are known. Known data processing systems are provided with storage devices, a processing unit or units, a visual display unit and input devices configured to receive input data in response to manual operation. Computer systems of this type may be programmed to produce three-dimensional animations in which a simulated three-dimensional world-space is displayed to a user. Furthermore, an animatable actor may be provided within this space. In this way, the actor may perform complex animations in response to relatively simple input commands, given that the actor is defined in terms of the physical bio-mechanical model and it's operation within three-dimensional world-space obeys pre-defined laws.

Different law types exist defining different model environments. Examples of different law types are kinematics and dynamics for example. Kinematics refers to the positions and velocities of points whereas dynamics takes into account the physical laws that govern kinematics, such as Newton's laws of motion. Both kinematics and dynamics may be inverted, along the lines of asking a question as to what velocity is required in order to reach a particular orientation at a particular point in time. With hierarchical many possible solutions may be available. Algorithms are known for producing possible results to such problems, usually referred to as inverse kinematics or inverse dynamics, which distinguishes them from the previously described forward kinematics and forward dynamics.

BRIEF SUMMARY OF THE INVENTION

According to a first aspect of the present invention, there is provided a method of producing animation data in a data processing system, said system comprising data storage means, processing means, visual display means and manually responsive input means, comprising the steps of displaying a simulated three-dimensional world-space to a user on said visual display means and displaying an animatable actor in said world-space; receiving first input data from a user via said manually responsive input means specifying a desired location and orientation for said actor to which said actor is to animate towards from a starting location; instructing said processing means to generate first animation data using a first processing technique in response to said first input data; instructing said processing means to generate second animation data using a second processing technique in response to said first input data; receiving second input data from a user via said manually responsive input means defining a blend parameter that defines a blending between said first animation data and said second animation data; and producing output animation data by interpolating between said first animation data and said second animation data to extents controlled by said received blending parameter.

In a preferred embodiment, the first processing technique invokes a forward kinematic procedure and said second processing technique may invoke an inverse kinematic procedure. Preferably, an adjustable control is displayed to a user by said visual display means, said adjustable control is controlled in response to user input data and said blend parameter is controlled in adjustments to said adjustable control. So the adjustable control may be a slider.

WRITTEN DESCRIPTION OF THE BEST MODE FOR CARRYING OUT THE INVENTION

Figure 1:
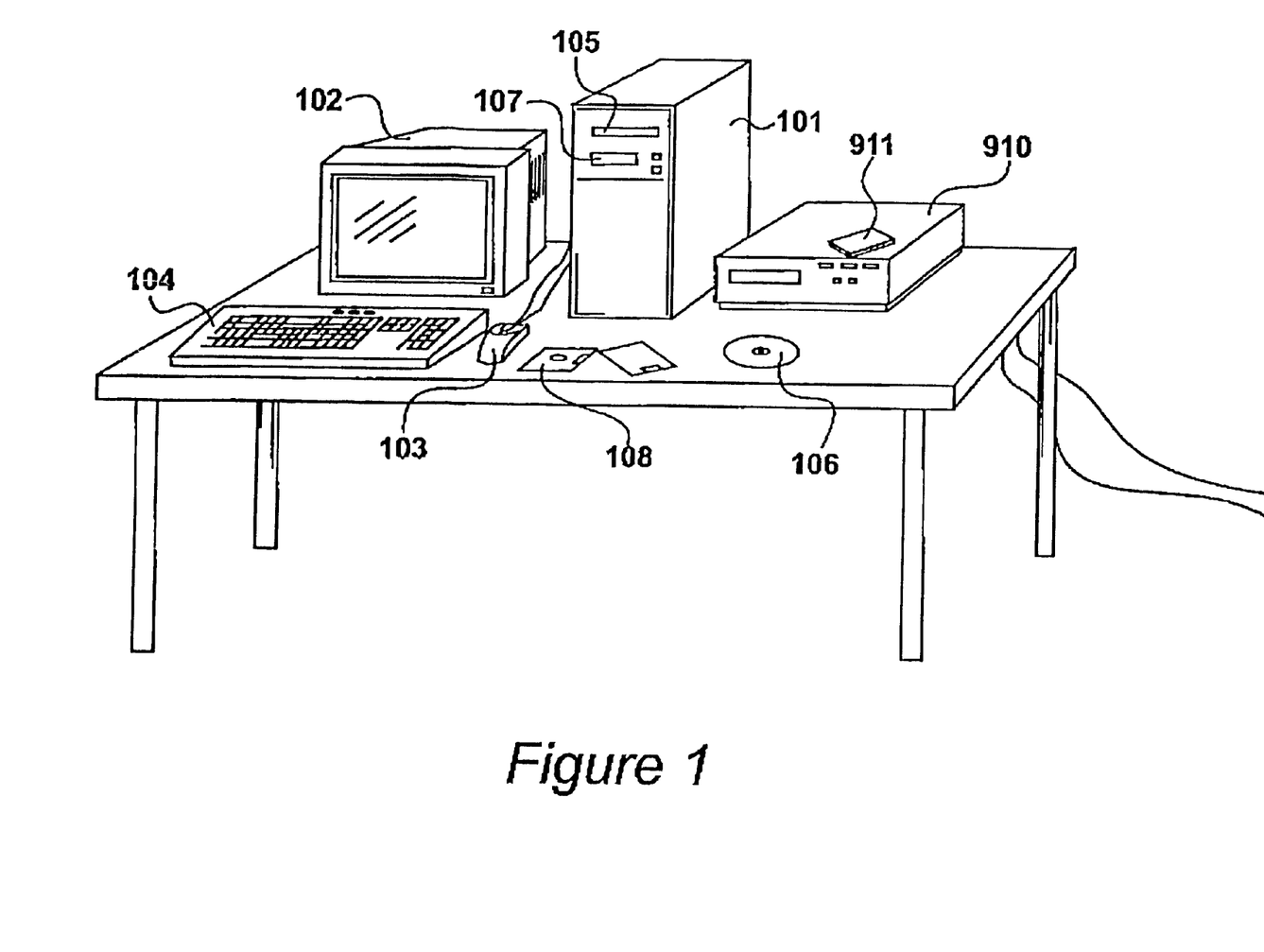
FIG. 1 shows a data processing system for producing animation data.

FIG. 1

A data processing system for producing animation data is shown in FIG. 1. The processing system includes a computer 101 a visual display unit 102, and manual input devices including a mouse 103 and a keyboard 104. Additional input devices could be included, such as stylus/touch-tablet combinations and tracker balls etc. The programmable computer 101 is configured to execute program instructions read from memory. The computer system 101 includes a drive 105 for receiving CD/ROM's such as ROM 106. In addition. A drive 107 is provided for receiving magnetic storage discs such as zip discs 108. Thus, animation data generated by the processing system 101 may be stored locally, written to movable storage media, such as zip discs 108, or distributed via networks and/or the internet.

Programmes executed by computer system 101 are configured to display a simulated three-dimensional world space to a user via the visual display unit 102. Within this world-space, one or more animatable actors may be shown and may be manipulated within the world space. Input data is received, possibly via mouse 103, to specify desired locations and orientations of the actor or actors within the three-dimensional world space. Having orientations and positions defined manually by a user, the computer system includes instructions to generate smooth animation data such that the actor or actors are seen to animate over a pre-determined time line.

Figure 2:
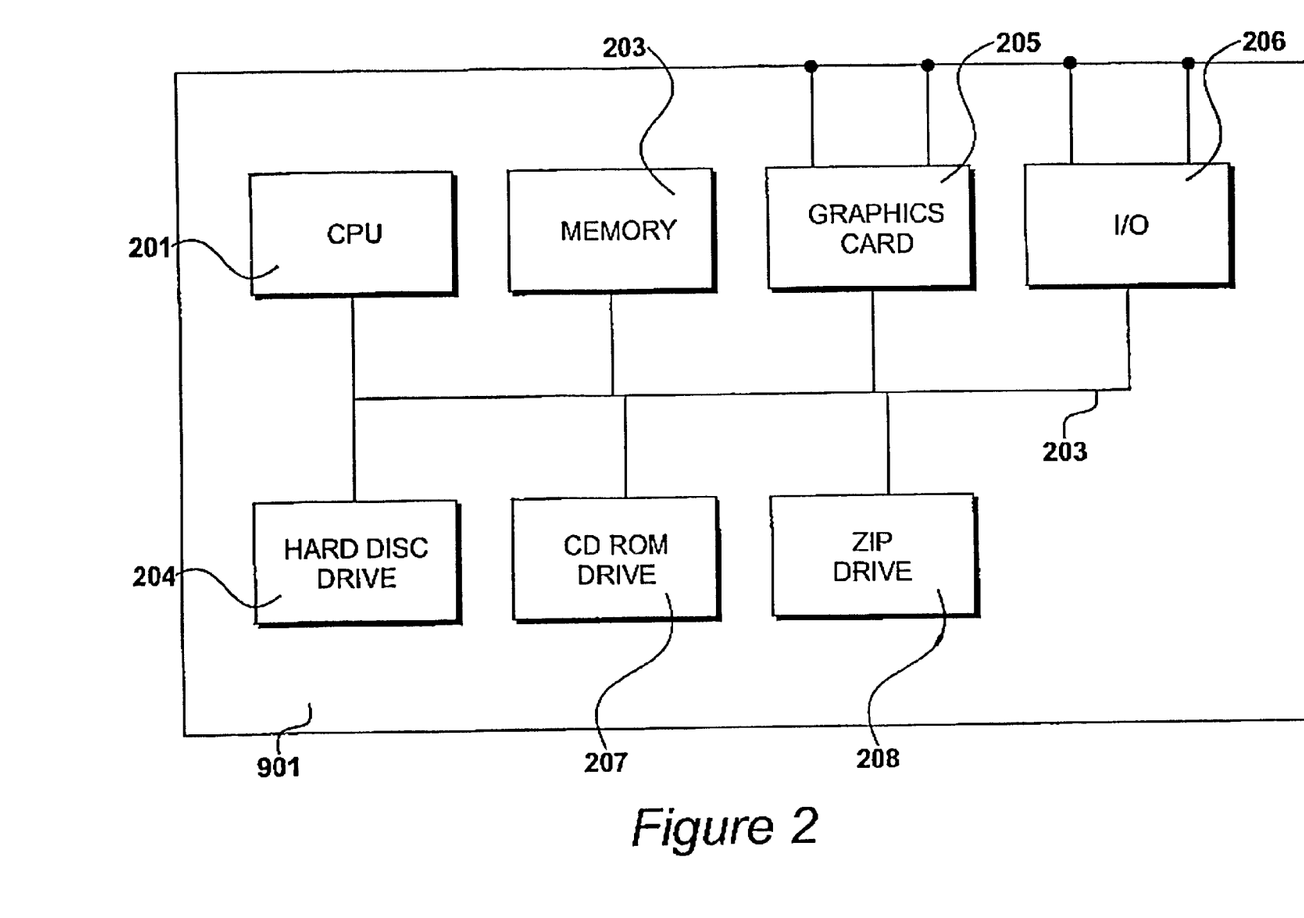
FIG. 2 details the computer system identified in FIG. 1.

FIG. 2

Computer system 101 is detailed in FIG. 2 and includes an Intel based central processing unit 201 operating under instructions received from random access memory devices 202 via a system bus 203. The memory devices 203 provide at least one hundred and twenty-eight megabytes of randomly accessible memory and executable programmes are loaded to this memory from the hard disc drive 204. Graphics card 205 is connected to the system bus 203 and supplies output graphical information to the visual display device 102. Input card 206 receives input data from the keyboard 104 and the mouse 103, and from any other input devices connected to the system. CD ROM drive 105 communicates with the processor 201 via an interface card 207 and similarly, the zip drive 107 communicates via a zip drive interface 208.

Figure 3:
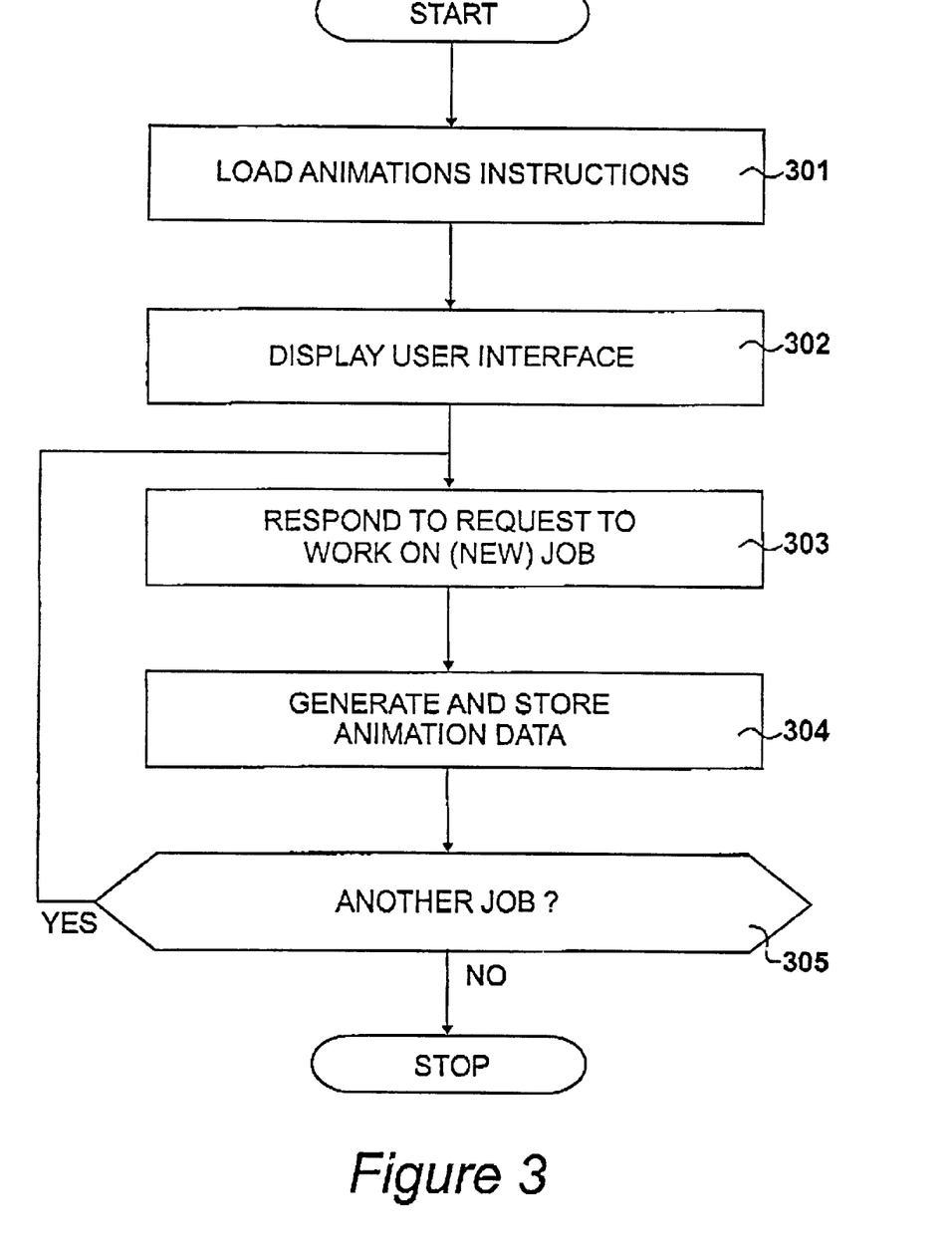
FIG. 3 identifies operations performed by the system shown in FIG. 2.

FIG. 3

Operations performed by the system shown if FIG. 2, when implementing a preferred embodiment of the present invention, are illustrated in FIG. 3. At step 301 animation instructions are loaded and at step 302 the user interface is displayed to the user.

At step 303 the system responds to a request to work on a job, which may involve loading previously created data so as to complete a job or may involve initiating a new job.

At step 304 animation data is generated and stored until an operator decides whether the session should close.

At step 305 a question is asked as to whether another job is to be considered and that when answered in the affirmative control is returned to step 303. Alternatively, the question asked at step 305 is answered in the negative, resulting in the procedures being terminated.

Figure 4:
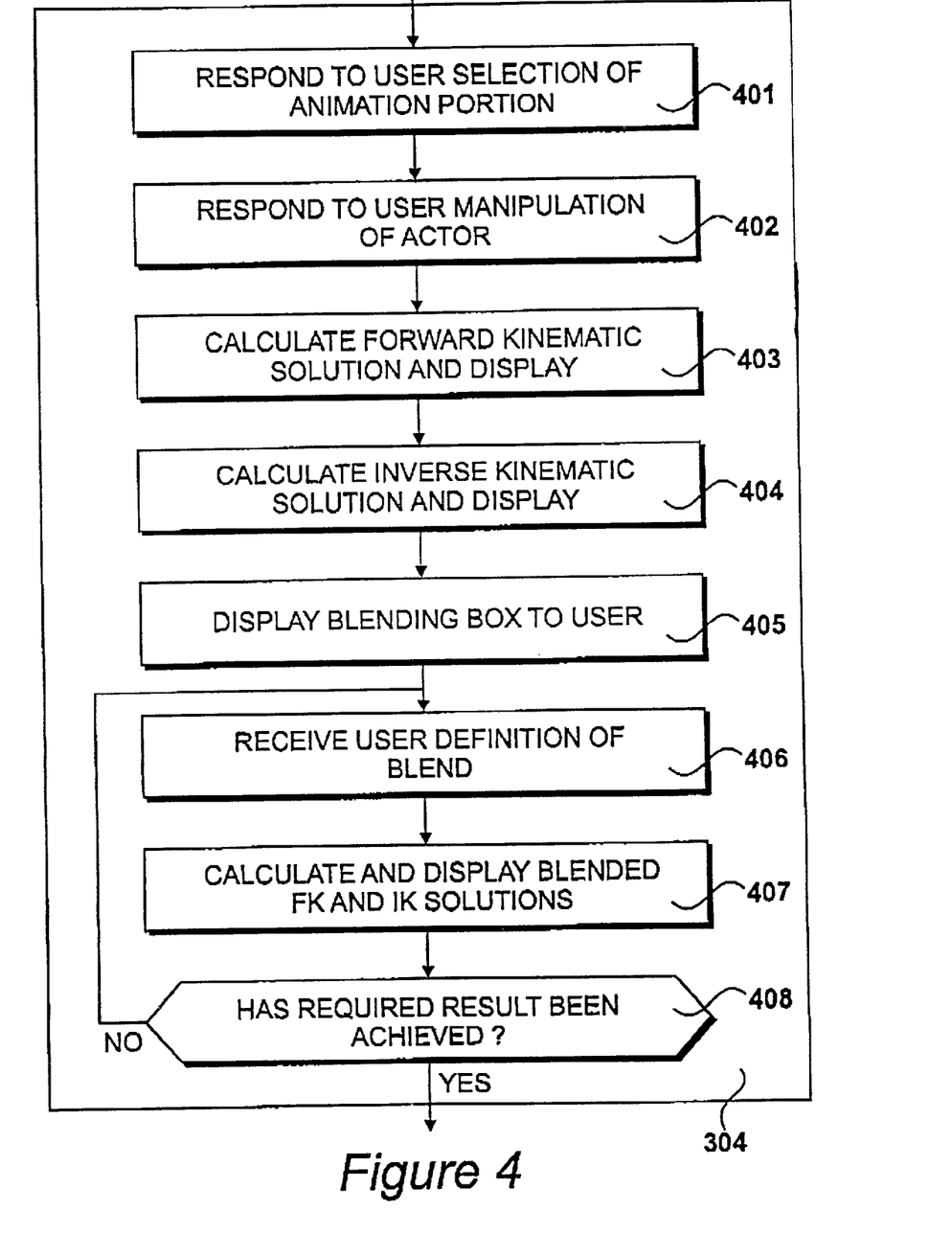
FIG. 4 details procedures for the generation of animation data identified in FIG. 3.

FIG. 4

Procedures for the generation of animation data identified in FIG. 3 are detailed in FIG. 4. At step 401 the system responds to a user selection of an animation portion. The animation as a whole is represented by a time-line and an icon or marker of some sort may traverse this time-line as the animation progresses. Thus, in order to define a particular part of the animation, a portion of the animation time-line is selected and shown highlighted.

At step 402 the system responds to user manipulation of a displayed actor, manipulated by appropriate user operation of the mouse 103 or of similar operation performed upon a stylus or tracker ball. This may be considered as an example of receiving first input data from a user. The first input data specifies a desired location and orientation for the actor to move towards over the selected portion of the time-line. Having received this first data, the processing system is configured to generate first animation data using a first processing technique in response to this first input data. In addition, the processing device is also configured to generate second animation data using a second processing technique in response to the same first input data. In the preferred embodiment, as illustrated at step 403, a forward kinematic solution is calculated and the resulting animation is displayed. Thereafter, at step 404, an inverse kinematic solution is calculated and this is again displayed to the user.

The user has therefore been provided with two possible solutions using different mathematical procedures. Often, one of these solutions will be preferred and this, to the larger extent, may depend on the nature of the animation task to be performed. However, in accordance with the preferred embodiment of the present invention, a user is provided with a facility to blend these two solutions together. Thus, at step 405 a blending box or similar graphical adjustable control is presented to the user such that a user may make a selection of the extent to which the final solution is derived proportionately from the forward kinematic solution or from the inverse kinematic solution. Thus, at step 407 the specified blend is calculated and the resulting blended forward kinematic and inverse kinematic solutions are displayed.

At step 408 a question is asked as to whether the required result has been achieved. If this question is answered in the negative, control is returned to step 406 and the system is again made ready to receive a user defined blend. Evidently, if the user has achieved a required result, the question asked at step 408 is answered in the affirmative and control is directed to step 305.

Figure 5:
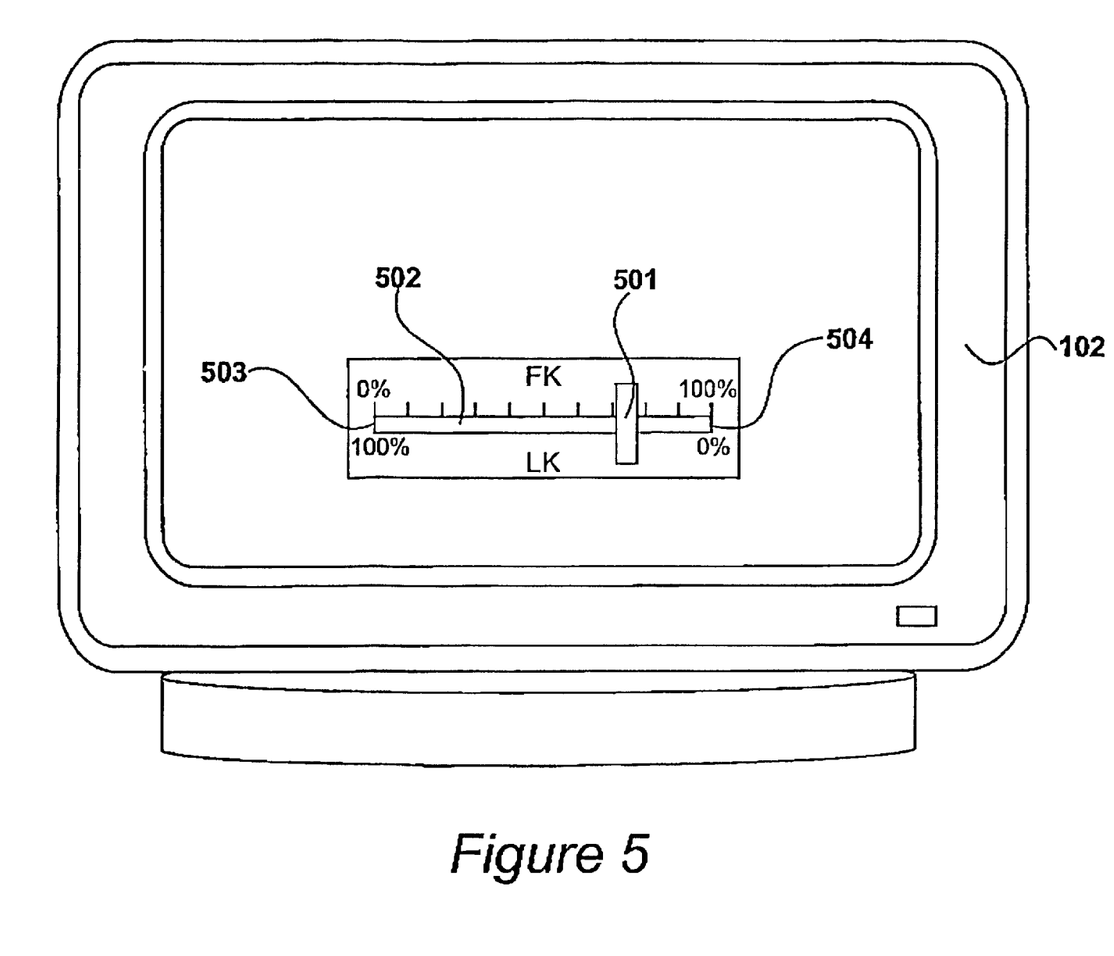
FIG. 5 illustrates a graphical user interface.

FIG. 5

A user definition of a blend is received in response to generating a graphical user interface of the type shown in FIG. 5. Using an input device such as mouse 103, a user selects a slider 501 and is then in a position to move slider 501 over a range as illustrated by line 502. At its left extreme 503 the blend consists of one hundred percent of the inverse kinematic solution and zero percent of the forward kinematic solution. Similarly at the right extreme 504, the blend consists of one hundred percent forward kinematic solution and zero percent inverse kinematic solution. Between these extremes the blend value is adjusted linearly.

It will be appreciated that other types of adjustable controls could be provided, each responsive in some way to manual operation of an input device and each providing an output indication via a suitable graphical display as to the extent of the blending value.

Figure 6:
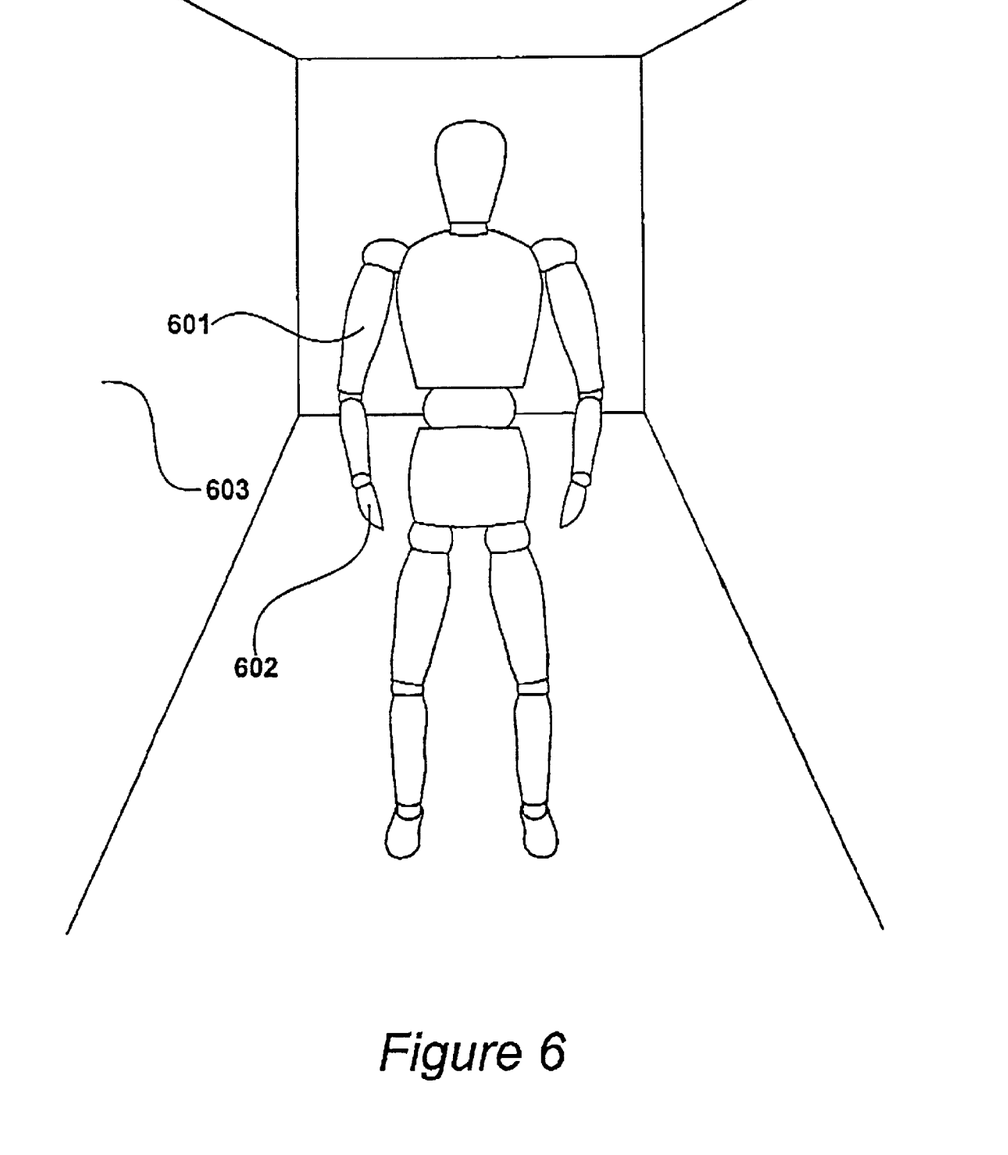
FIG. 6 illustrates an actor represented in a three-dimensional world-space.

FIG. 6

An actor, represented in a three-dimensional world space, is illustrated in FIG. 6. A bio mechanical model is associated with the actor such that movements of the actor are restrained by the constraints defined by the model. Consequently, an actor may be displayed as a collection of interconnected bones or, alternatively, and as shown in FIG. 6, an actor may be displayed in a more solid form. The actor when displayed in this form allows animations to be created. It is therefore used as part of the process for generating animation data. This animation data would then be rendered with character and background data to produce a sequence of output images. The number of images required per second is determined by the standard of output frame images being required. Consequently, the generation of images of this type may be controlled in response to time code.

After establishing key-frame positions, usually the start and end of a portion of animation, the processing system executes program instructions to invoke an animation solver. The animation solver produces mathematical descriptions of joint movements. These mathematical descriptions of joint movements are essentially continuous functions over time. A particular animation data set is then produced by plotting individual positions. Thus, the animation solver is providing output animation solutions based on functions of time, where the time value is derived from a representation of time code.

Many different types of solver are known. Animation systems often make use of kinematics that refers to the positions and velocities of points. This contrasts with dynamics that also takes into account the physical laws that govern kinematics, such as Newton's laws and motion. Both kinematics and dynamics may be inverted. When considered in the forward direction, a displacement, velocity or acceleration is defined from which new positional data is calculated. In the inverse operation the question is inverted so as to say what velocity would be required in order to reach a particular position.

In the example shown with respect to FIGS. 6, 7, 8 and 9 an actor performs an animation in which an arm is lifted, rotated and then the hips rotate in order for a hand to touch a wall. The overall instruction to the actor is "touch the wall". However, in order to effect the animation with a hand touching a wall at a specified position, the actual body part locations moved to achieve this overall goal may adopt many possible variations. Consequently, it is known that inverse solutions are more difficult to achieve given that they result in many valid possible outputs rather than one unique output. In many known systems these inverse problems are typically solved by numerical iteration techniques.

In a preferred embodiment of the present invention, first input data specifies a desired position and orientation for an actor. The processing system generates first animation data using a first processing technique which, for example, may be a forward kinematic solution. Further instructions applied to the processing system configure the processing system to generate second animation data using a second processing technique in response to the same first input data. In the preferred embodiment, an inverse kinematic solution is provided for the second data set. The preferred embodiment of the invention then further provides for a third solution to be derived that results from combining the first solution with the second solution to an extent controlled by the user in response to the user specifying a blend value.

An actor 601 is shown in FIG. 6 in a "relaxed" mode in which all of the adjustable joints are set substantially at their mid-point. The user wishes to define an animation in which the actor raises a right hand 602 to touch wall position 603, as illustrated in FIG. 7.

Figure 7:
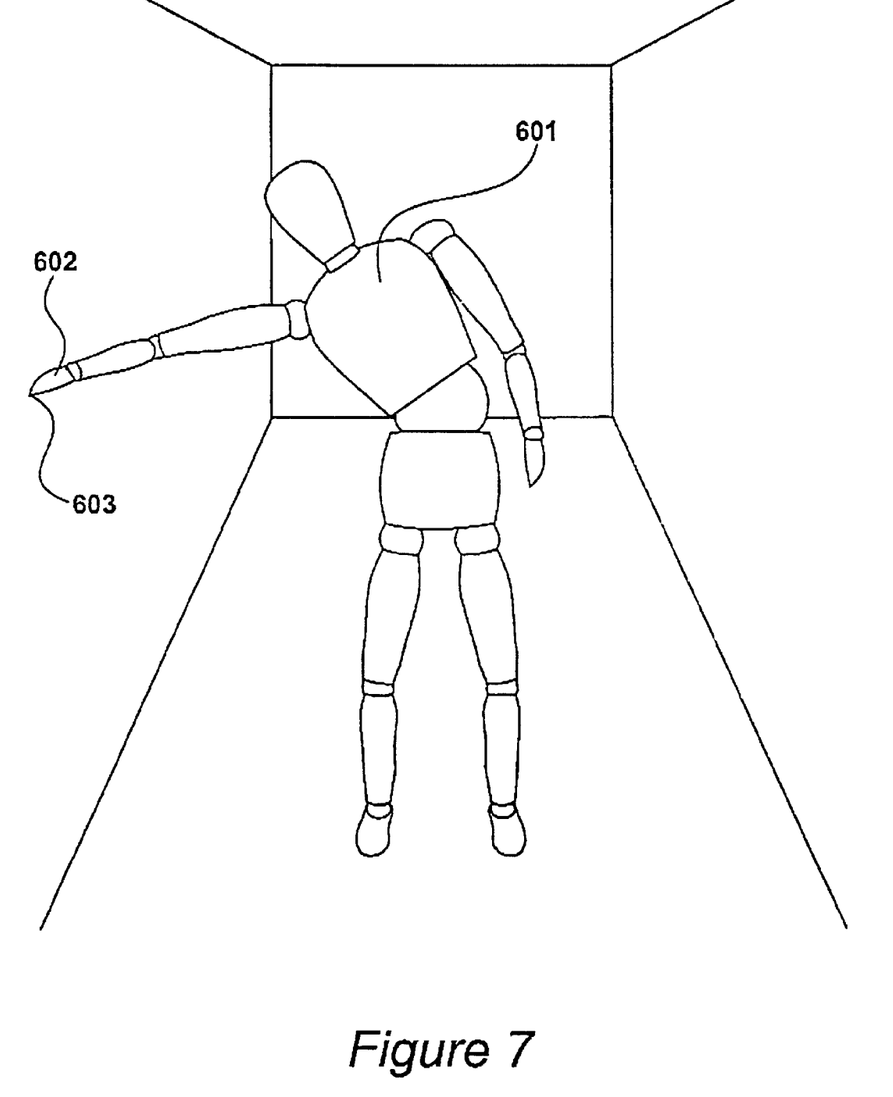
FIG. 7 illustrates further motion of the actor shown in FIG. 6.

FIG. 7

In order to define the motion required, it is not necessary for the user to define many individual frames for the movement. The user positions a mouse cursor over the item to be moved, ie the actor's hand. With pressure applied to a mouse button, or in response to a similar manual operation, the hand 602 is dragged to the required position such that the finger tips are brought into contact at position 603. As the cursor is moved, inverse kinematic solutions are provided in real-time so that the actor moves with the cursor movement until a selection is defined.

Figure 8:
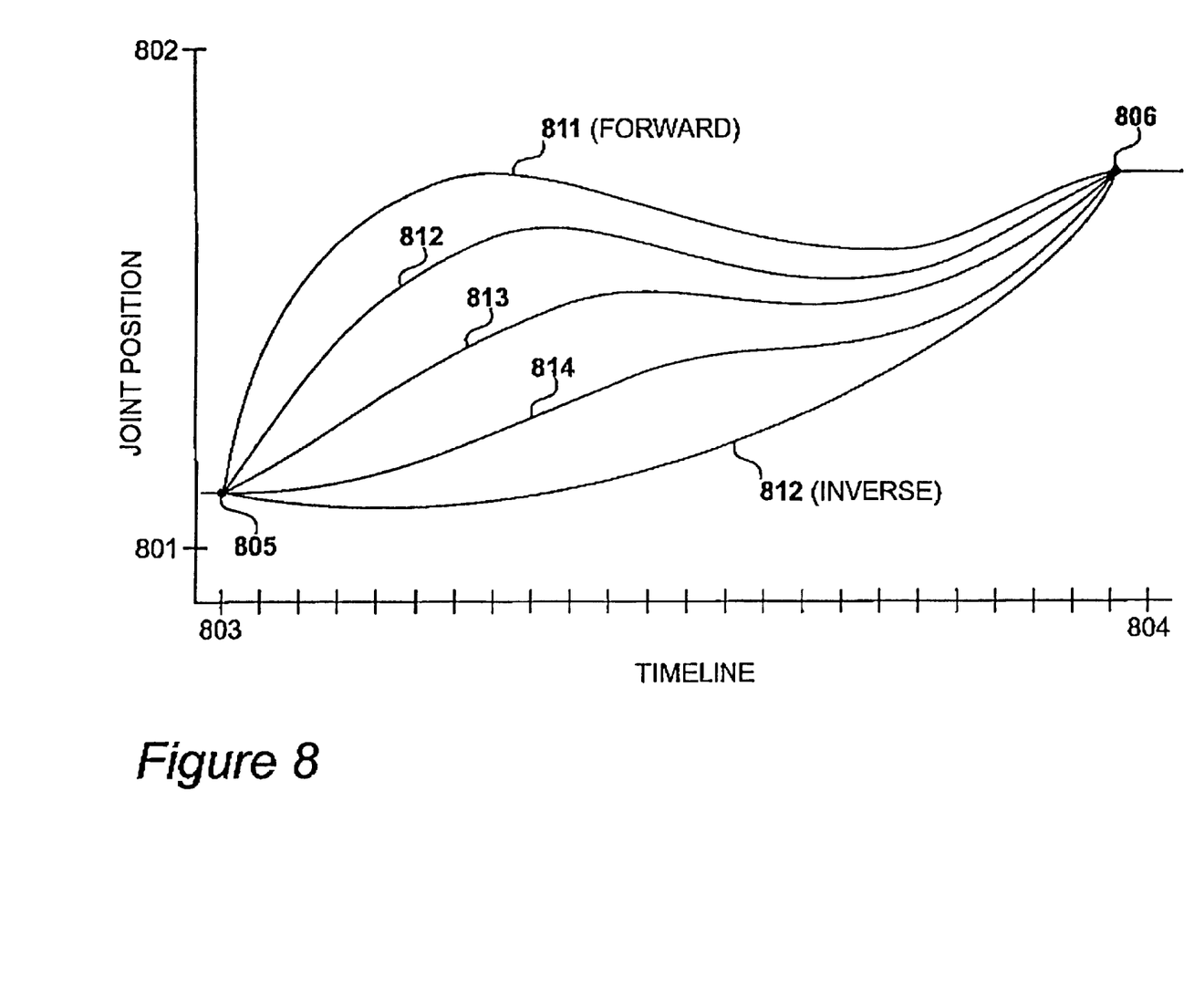
FIG. 8 illustrates joint rotation for the actor illustrated in FIGS. 6 and 7.

FIG. 8

After defining a start position (as represented in FIG. 6) and after defining a finishing position (as defined in FIG. 7) the forward kinematic solver is required to provide a first animation solution and the inverse kinematic solver is called upon to provide a second animation solution.

During an animation, each joint may rotate (in two or three dimensions depending upon type) between allowable extremes. A movement of this type is illustrated graphically in FIG. 8. The two dimensional joint under consideration may move between a start point 801 and an end point 802. This animation takes place through a timeline running from a start time 803 through to an end time 804. At the start of the timeline the joint is at a particular position as illustrated by point 805. At the end of the timeline, the joint has moved as illustrated by location 806. Thus, positions 805 and 806 may be defined by a user and may be considered as key frames. Over the timeline, from the start 803 to the end 804, a smooth animation curve is calculated by the animation solver. However, in the present preferred embodiment, two solutions are made and then, assuming the solutions are different, it is possible to select a blending of these functions.

In the example shown in FIG. 8, a forward kinematic solution has produced animation curve 811. Similarly, an inverse kinematic solution has produced an animation curve 812. Thus, when building the animation, a user may select the forward kinematic solution, illustrated by curve 811 or a user may select the inverse kinematic solution illustrated by curve 812. Furthermore, by controlling the blending between these two solutions, there is a family of curves lying between the extremes 811 and 812.

Three curves 812, 813 and 814 are illustrated in FIG. 8. Curve 812 represents an animation that would occur when seventy five percent of the forward solution is blended with twenty five percent of the inverse solution. Similarly, curve 813 represents an animation that would occur when fifty percent of the forward solution is blended with fifty percent of the inverse solution. Similarly, curve 814 represents an animation that would occur when seventy five percent of the forward solution is blended with twenty five percent of the inverse solution. Thus, it can be appreciated that many specific animation curves are available to a user dependant upon a selection being defined for the blending value using the graphical interface previously described.

What we claim is:

1. A method of producing animation data in a data processing system, said system comprising data storage means, processing means, visual display means and manually responsive input means, comprising the steps of displaying a simulated three-dimensional world-space to a user on said visual display means and displaying an animatable actor in said world space;

receiving first input data from a user via said manually responsive input means specifying a desired location and orientation for said actor to which said actor is to animate towards from a starting location;

instructing said processing means to generate first animation data using a first processing technique in response to said first input data;

instructing said processing means to generate second animation data using a second processing technique in response to said first input data;

receiving second input data from a user via said manually responsive input means defining a blend parameter that defines a blending between said first animation data and said second animation data; and producing output animation data by interpolating between said first animation data and said second animation data to extents controlled by said received blending parameter.

2. A method according to claim 1, wherein said input means includes a mouse, a tracker ball or a stylus.

3. A method according to claim 1, wherein said animatable actor is displayed as body sections or said actor is displayed as bones with joints.

4. A method according to claim 1, wherein input data specifying a desired location is provided by positioning the actor wherein animated intermediate positions are calculated in real time and displayed to the user via said visual display means.

5. A method according to claim 1, wherein actor animations are plotted and displayed in real time.

6. A method according to claim 1, wherein animation data is rendered with character and background data to produce a sequence of out put images.

7. A method according to claim 1, wherein said first processing technique invokes a forward kinematic procedure.

8. A method according to claim 1, wherein said second processing technique invokes an inverse kinematic procedure.

9. A method according to claim 8, wherein said inverse kinematic procedure starts from a forward kinematic solution and performs a series of iterations to produce a refined solution.

10. A method according to claim 1, wherein said first technique and said second technique produce animation data as modelled body part movements.

11. A method according to claim 10, wherein said body part movements are defined as mathematical equations.

12. A method according to claim 11, wherein said animation data is produced by plotting said mathematical equations at a pre-determined rate.

13. A method according to claim 12, wherein said predetermined rate is specified by time code.

14. A method according to claim 1, wherein an adjustable control is displayed to a user by said visual display means;
   said adjustable control is controlled in response to user input data; and
   said blend parameter is controlled in response to adjustments of said adjustable control.

15. A method according to claim 14, wherein said displayed adjustable control is a slider.

16. A computer-readable medium having computer-readable instructions executable by a computer such that, when executing said instructions, a computer will perform the steps of:
   displaying a simulated three-dimensional world-space to a user and displaying an animatable actor in said world-space;
   responding to user input specifying the desired location and orientation for said actor to which said actor is to animate towards from a starting location;
   generating first animation data using a first processing technique in response to said first input data;
   generating second animation data using a second processing technique in response to said first input data;
   responding to second input data from a user identifying a blend parameter that defines a blending between said first said animation data and said second animation data; and
   producing output animation data by interpolating between said first animation data and said second animation data to extents controlled by said received blending parameter.

17. A computer-readable medium having computer-readable instructions according to claim 16, such that when executing said instructions a forward kinematic procedure will be implemented.

18. A computer-readable medium having computer-readable instructions according to claim 16, wherein inverse kinematic procedures are performed.

* * * * *